US012518610B2

(12) United States Patent
Amishay

(10) Patent No.: US 12,518,610 B2
(45) Date of Patent: Jan. 6, 2026

(54) WEARABLE COMPUTING DEVICE FOR PREVENTING DROWNING

(71) Applicant: Daniel Amishay, Bay Harbor Islands, FL (US)

(72) Inventor: Daniel Amishay, Bay Harbor Islands, FL (US)

(*) Notice: Subject to any disclaimer, the term of this patent is extended or adjusted under 35 U.S.C. 154(b) by 0 days.

(21) Appl. No.: 19/241,319

(22) Filed: Jun. 17, 2025

(65) Prior Publication Data

US 2025/0384755 A1  Dec. 18, 2025

Related U.S. Application Data

(60) Provisional application No. 63/660,762, filed on Jun. 17, 2024.

(51) Int. Cl.
| | |
|---|---|
| *G08B 21/08* | (2006.01) |
| *A61B 5/00* | (2006.01) |
| *A61B 5/0205* | (2006.01) |
| *A61B 5/11* | (2006.01) |
| *B63C 9/00* | (2006.01) |
| *G08B 7/06* | (2006.01) |

(52) U.S. Cl.
CPC ........ *G08B 21/088* (2013.01); *A61B 5/02055* (2013.01); *A61B 5/1112* (2013.01); *A61B 5/681* (2013.01); *A61B 5/746* (2013.01); *A61B 5/747* (2013.01); *B63C 9/0005* (2013.01); *G08B 7/06* (2013.01); *A61B 2503/06* (2013.01); *A61B 2560/0252* (2013.01); *B63C 2009/0017* (2013.01)

(58) Field of Classification Search
None
See application file for complete search history.

(56) References Cited

U.S. PATENT DOCUMENTS

| | | | |
|---|---|---|---|
| 4,305,143 A | 12/1981 | Simms | |
| 4,853,691 A | 8/1989 | Kolbatz | |
| 5,049,859 A | 9/1991 | Arnell | |
| 5,091,714 A | 2/1992 | de Soliminihac | |
| 5,097,254 A | 3/1992 | Merrithew | |
| 5,408,222 A | 4/1995 | Yaffe | |
| 5,486,814 A | 1/1996 | Quinones | |
| 6,154,140 A | 11/2000 | Thorpe et al. | |

(Continued)

FOREIGN PATENT DOCUMENTS

| | | |
|---|---|---|
| EP | 1927958 A1 | 6/2008 |
| WO | 2006020130 A2 | 2/2006 |
| WO | 2014151432 A2 | 9/2014 |

*Primary Examiner* — John F Mortell
(74) *Attorney, Agent, or Firm* — Mark Terry

(57) ABSTRACT

A wearable safety device for preventing drowning includes a housing for wearing on a user's wrist or limb and configured to be waterproof, biometric sensors, a motion sensor, a water detection subsystem, a processor for receiving input data from the biometric sensors, the motion sensor, and the water detection subsystem, and to evaluate whether the input data indicates a potential drowning or distress event based on predetermined threshold logic, a dye release mechanism for visibly marking surrounding water with a non-toxic dye upon activation by the processor, an alert subsystem communicably coupled, and a wireless communication module for transmitting a distress signal to a paired mobile device or networked system.

20 Claims, 11 Drawing Sheets

(56) References Cited

U.S. PATENT DOCUMENTS

| | | | |
|---|---|---|---|
| 6,246,329 B1* | 6/2001 | King | G08B 5/40 |
| | | | 340/573.6 |
| 6,486,777 B2 | 11/2002 | Clark | |
| 9,672,716 B2 | 6/2017 | Carroll | |
| 10,803,724 B2 | 10/2020 | Bodi | |
| 2003/0222782 A1 | 12/2003 | Gaudreau | |
| 2004/0095248 A1 | 5/2004 | Mandel | |
| 2007/0123121 A1 | 5/2007 | Quintero | |
| 2007/0167145 A1 | 7/2007 | Bonnenfant | |
| 2008/0150733 A1 | 6/2008 | Snyder et al. | |
| 2008/0266118 A1 | 10/2008 | Pierson | |
| 2008/0278338 A1 | 11/2008 | Krell | |
| 2009/0027211 A1 | 1/2009 | Cutler et al. | |
| 2009/0251321 A1 | 10/2009 | Delorey | |
| 2009/0295566 A1* | 12/2009 | Weintraub | G08B 21/088 |
| | | | 340/573.6 |
| 2009/0309739 A1 | 12/2009 | Ezer | |
| 2010/0176956 A1 | 7/2010 | Moerschell | |
| 2011/0187538 A1 | 8/2011 | Hawkins | |
| 2014/0277252 A1* | 9/2014 | Hyde | A61M 16/0009 |
| | | | 607/42 |
| 2020/0126391 A1 | 4/2020 | Lovett | |
| 2021/0403132 A1 | 12/2021 | Pourmasiha | |
| 2022/0036717 A1* | 2/2022 | Lovett | G06F 1/163 |

* cited by examiner

WEARABLE COMPUTING DEVICE FOR PREVENTING DROWNING

CROSS-REFERENCE TO RELATED APPLICATIONS

This patent application claims priority to provisional patent application 63/660,762 filed Jun. 17, 2024 and titled "Wearable Computing Device for Preventing Drowning." The subject matter of provisional patent application 63/660,762 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to the field of safety devices and, more specifically, relates to the field of marine safety devices designed to prevent drowning and enhance safety for individuals engaged in water-based activities.

BACKGROUND

Drowning remains a significant global issue, with millions of cases reported annually. It is the third leading cause of unintentional injury death worldwide, accounting for 7% of all injury-related deaths. The current state of marine safety devices has evolved considerably over the years, yet challenges remain in ensuring the highest level of protection and ease of use.

Personal Flotation Devices (PFDs) are among the most common and widely used safety devices designed to prevent drowning. PFDs, including life jackets and buoyancy aids, are required by law in many regions for individuals participating in boating and other water activities. These devices are designed to keep the wearer afloat, thereby preventing drowning in the event of an accident. Modern PFDs are constructed from lightweight, buoyant materials and are designed to be comfortable to wear for extended periods. However, compliance with wearing PFDs remains an issue, especially among adults, due to perceived discomfort and restricted movement.

Automatic inflatable life jackets have gained popularity due to their convenience and compact design. These life jackets automatically inflate when submerged in water, providing buoyancy to the wearer. They are particularly favored for their non-bulky nature, making them more likely to be worn compared to traditional PFDs. Despite their advantages, these devices have limitations, such as potential malfunctions of the inflation mechanism and the need for regular maintenance and inspections.

Lifebuoys and other throwable flotation devices are essential safety tools commonly found on boats and in swimming areas. They provide immediate assistance to individuals in distress, allowing them to stay afloat until they can be rescued. While effective in many situations, their use depends heavily on the availability of a person to throw the device and the ability of the individual in distress to grasp and hold onto the lifebuoy.

Despite the advancements in marine safety devices, several challenges persist. Ensuring consistent use of safety devices remain significant hurdles. Additionally, the effectiveness of many devices can be compromised by user error, mechanical failure, or adverse environmental conditions. Therefore, a need exists to overcome the problems with the prior art as discussed above, and particularly for a more effective, efficient, and safe way of preventing drowning.

SUMMARY

A device for preventing drowning is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a wearable safety device for preventing drowning is provided that solves the above-described problems. The device includes a housing configured to be worn on a user's wrist or limb and configured to be waterproof, one or more biometric sensors located within the housing, the one or more biometric sensors configured to measure data selected from the group consisting of heart rate, blood oxygen level, skin temperature, and respiration rate, at least one motion sensor located within the housing, a water detection subsystem coupled to the housing, the water detection subsystem comprising an element selected from the group consisting of a submersion timer, a water conductivity sensor, and a pressure sensor, a processor located within the housing, the processor configured to receive input data from the one or more biometric sensors, the at least one motion sensor, and the water detection subsystem, and to evaluate whether the input data indicates a potential drowning or distress event based on predetermined threshold logic, a dye release mechanism communicably coupled with the processor, the dye release mechanism configured to visibly mark surrounding water with a non-toxic dye upon activation by the processor, an alert subsystem communicably coupled with the processor, the alert subsystem comprising a speaker or buzzer and at least one LED, configured to activate upon activation by the processor, and a wireless communication module communicably coupled with the processor, the wireless communication module configured to transmit a distress signal to a paired mobile device or networked system.

BRIEF DESCRIPTION OF THE DRAWINGS

The accompanying drawings, which are incorporated in and constitute a part of this disclosure, illustrate various example embodiments. In the drawings.

DETAILED DESCRIPTION

Figure 1:
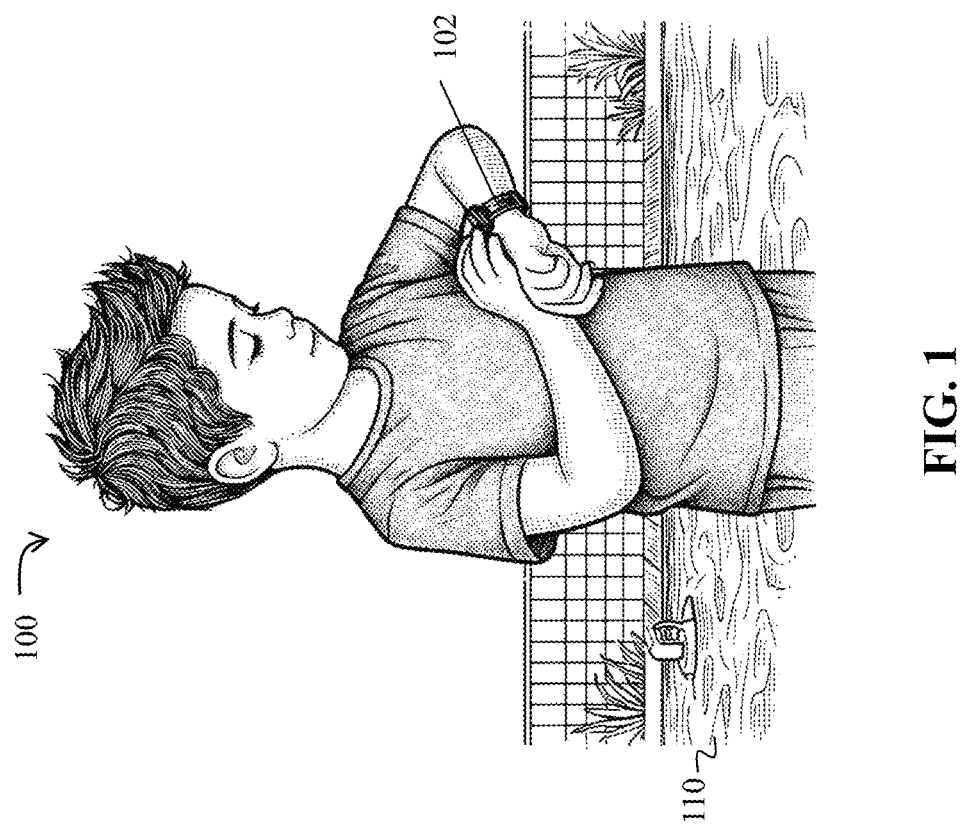
FIG. 1 depicts an illustration of a person wearing the wearable computing device, according to an embodiment.

The following detailed description refers to the accompanying drawings. Wherever possible, the same reference numbers are used in the drawings and the following description to refer to the same or similar elements. While embodiments of the claimed subject matter may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed subject matter, i.e., the wearable computing device for preventing drowning, offers significant advantages over existing marine safety devices, addressing several key issues inherent in the prior art. Firstly, the integration of vital sign monitoring with immersion detection and immediate response mechanisms provides a comprehensive approach to drowning prevention. Traditional Personal Flotation Devices (PFDs) and automatic inflatable life jackets, while effective in providing buoyancy, do not offer real-time health monitoring or automatic alerting capabilities. By continuously collecting vital sign data and transmitting it to connected devices, the claimed subject matter ensures that any abnormal physiological changes indicating distress are promptly detected and addressed, potentially saving lives by allowing for quicker intervention.

Another major advantage of the claimed subject matter is its enhanced usability and compliance. Many existing safety devices are often bulky, uncomfortable, or perceived as restrictive, leading to inconsistent usage, especially among adults. The wearable nature of this device, designed as a wristband, ensures ease of use and comfort, encouraging more consistent wear. Its compact and unobtrusive design does not impede movement, making it suitable for a variety of water activities. Additionally, the inclusion of a dye emission apparatus that activates upon immersion (wherein vital sign confirms this fact) provides a highly visible signal to rescuers, significantly improving the chances of a timely rescue in both clear and murky waters.

Finally, the claimed subject matter's ability to connect with other computing devices through RF transmission extends its functionality beyond basic safety features. This connectivity allows for the integration of GPS tracking, enabling precise location monitoring and rapid response in emergencies. In comparison to lifebuoys and throwing devices, which rely on the presence and reaction of nearby individuals, the automated alert and location transmission capabilities of the claimed subject matter ensure that help can be dispatched promptly, even if the wearer is alone or out of direct line of sight.

The accompanying drawings, which are incorporated in and constitute a part of this disclosure, illustrate various example embodiments. The claimed wearable computing device for preventing drowning will now be described with respect to FIGS. 1 through 4.

FIG. 1 depicts an illustration of a person 100 wearing the wearable safety device 102 while standing next to a swimming pool 110, according to an embodiment. The device 102, prominently displayed on the child's wrist, is designed to fit securely and comfortably. The device 102 may also fit toddlers and babies with a size adjustable feature. FIG. 1 highlights the device's sleek, unobtrusive design, ensuring it does not hinder the child's movements. The pool setting underscores the intended environment for the device's use, emphasizing its role in enhancing safety during water activities. The child's proximity to the pool serves to illustrate the critical function of the device in monitoring vital signs and detecting immersion, ready to provide immediate alerts and safety measures should the child fall into the water.

Figure 2:
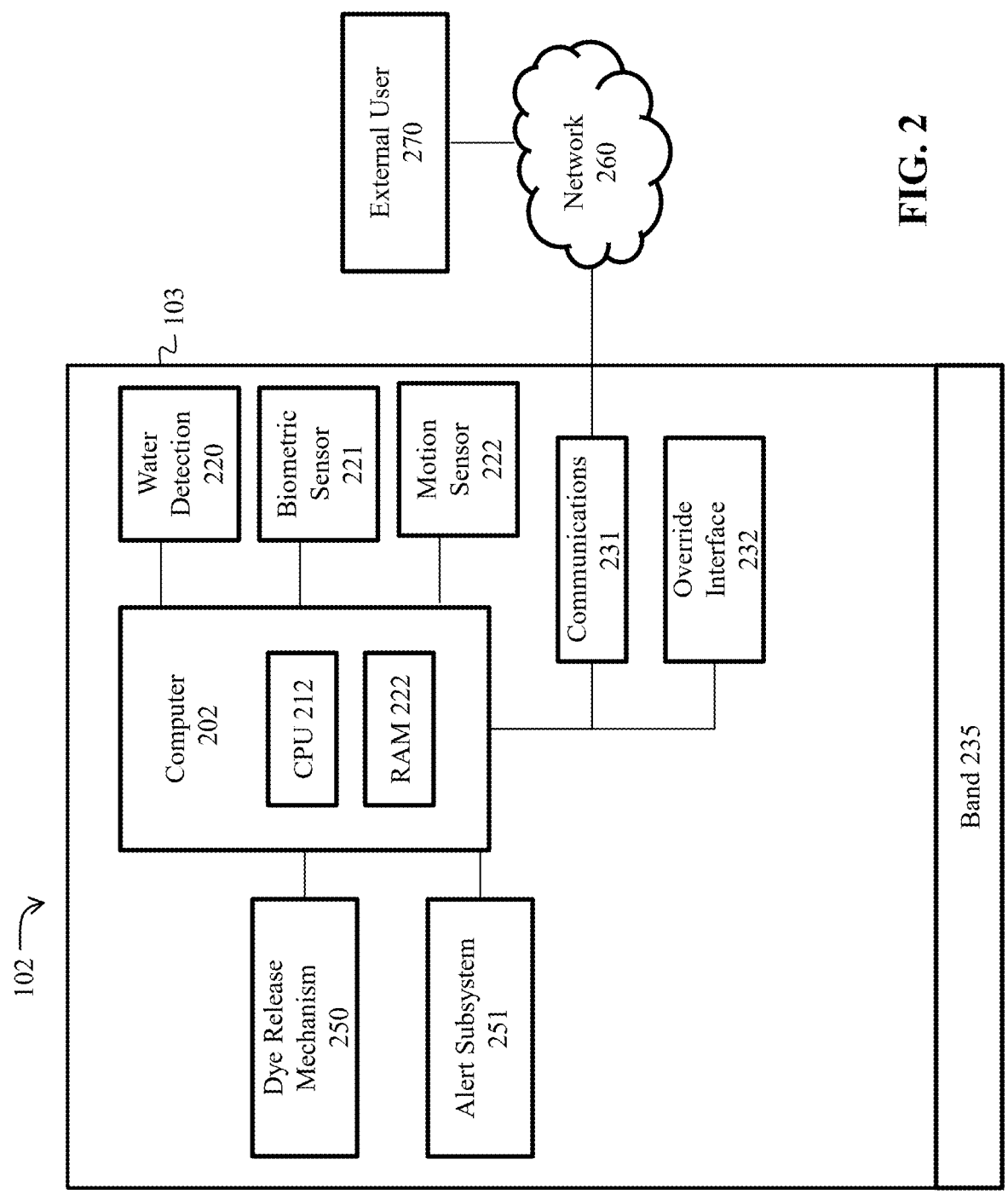
FIG. 2 depicts a block diagram showing the components of the wearable computing device, according to an embodiment.

FIG. 2 illustrates a block diagram of the wearable safety device 102 and its functional components, as well as its communication with a network 260 and an external user 270, according to one embodiment. As shown, the wearable safety device 102 includes a computer 202 that acts as the central control unit housed within a waterproof housing 103. The computer 202 comprises a central processing unit (CPU) 212, which serves as the primary processor responsible for executing instructions, analyzing incoming data, and managing the operations of all other subsystems within the device. The CPU 212 is operatively supported by a random-access memory (RAM) 222, which temporarily stores operating data and instructions necessary for processing biometric, motion, and environmental inputs in real time.

The device 102 incorporates one or more biometric sensors 221 housed within the waterproof housing 103. These biometric sensors are configured to measure physiological parameters of the wearer, including but not limited to heart rate, blood oxygen saturation level, skin temperature, and respiration rate. Biometric sensors may include both contact-based and non-contact options (e.g., optical or skin-adjacent). This biometric information is continuously relayed to the CPU 212 for monitoring and threshold-based evaluation. In addition to the biometric sensors, the device includes at least one motion sensor 222 positioned within the housing 103. The motion sensor detects movements or lack thereof, providing further context to the CPU 212 for assessing whether the wearer is active, immobile, or in an irregular motion state that could signal distress.

The wearable safety device 102 also comprises a water detection subsystem 220 securely integrated with the housing 103. The water detection subsystem may include one or more elements such as a submersion timer, a water conductivity sensor, or a pressure sensor, each capable of detecting the presence and duration of water contact or immersion. Data from the water detection subsystem 220 is continuously fed to the CPU 212, which processes this information alongside biometric and motion sensor inputs to evaluate whether conditions meet predetermined thresholds indicative of a potential drowning or distress event.

When the CPU 212 determines that such conditions exist, it actuates multiple responsive safety mechanisms. A dye release mechanism 250 is communicably coupled with the CPU 212 and is designed to deploy a non-toxic, highly visible dye into the surrounding water when activated. This dye release mechanism includes a sealed cartridge storing the dye and, in some embodiments, an electromechanical actuator configured to pierce the cartridge to release the dye. The cartridge may be replaceable to ensure continued functionality over time. The emitted dye serves as a visual marker, enhancing the ability of rescuers to quickly locate the wearer in water. The dye release mechanism may vary in color, volume, and dispersal method, and may include single-use or refillable cartridges.

Simultaneously, an alert subsystem 251, also connected to the CPU 212, is triggered. This alert subsystem comprises an audible output element, such as a speaker or buzzer, and at least one light-emitting diode (LED). When activated, the speaker or buzzer emits a loud alarm, while the LED flashes to attract attention to the wearer's location. This combination of audible and visual alerts provides redundancy, ensuring the emergency signal is perceivable under various environmental conditions.

A wireless communication system 231 is likewise communicably coupled with the CPU 212 and configured to transmit a distress signal automatically upon detection of a potential drowning or distress scenario. Wireless communication may utilize Wi-Fi, Bluetooth, cellular, or future equivalents, and optionally integrate with a mobile or cloud-based monitoring system. The wireless communication system can relay this signal, along with optional location data when a GPS module is present, to a paired mobile device or networked system via the network 260. The network 260 represents the broader communication infrastructure—such as Wi-Fi, cellular, or Bluetooth channels—that allows seamless data transmission to designated contacts, caregivers, lifeguards, emergency services, or remote monitoring centers.

The wearable safety device 102 further includes an override interface 232 communicably coupled with the CPU 212. This override interface provides a manual input, such as a button, enabling the wearer or a nearby individual to cancel or override automatic activation of the dye release mechanism and the alert subsystem if appropriate, thereby preventing false alarms in non-emergency situations.

A band 235 is securely attached to the waterproof housing 103 to fasten the entire device assembly to the wearer's wrist or limb comfortably. The band is constructed from waterproof and hypoallergenic materials, ensuring both durability and wearer comfort during prolonged use in aquatic environments.

Finally, FIG. 2 shows an external user 270 who may be a family member, lifeguard, caregiver, or remote monitoring personnel receiving transmitted alerts and data via the network 260. This ensures that if a distress signal is generated by the device 102, immediate action can be taken to assist the wearer quickly and effectively. Collectively, the arrangement depicted in FIG. 2 demonstrates how the integrated sensors, processor, dye release mechanism, alert subsystem, wireless communication module, GPS module, and override interface work in concert within a durable, wearable housing to provide comprehensive drowning prevention and emergency response functionality.

Figure 3:
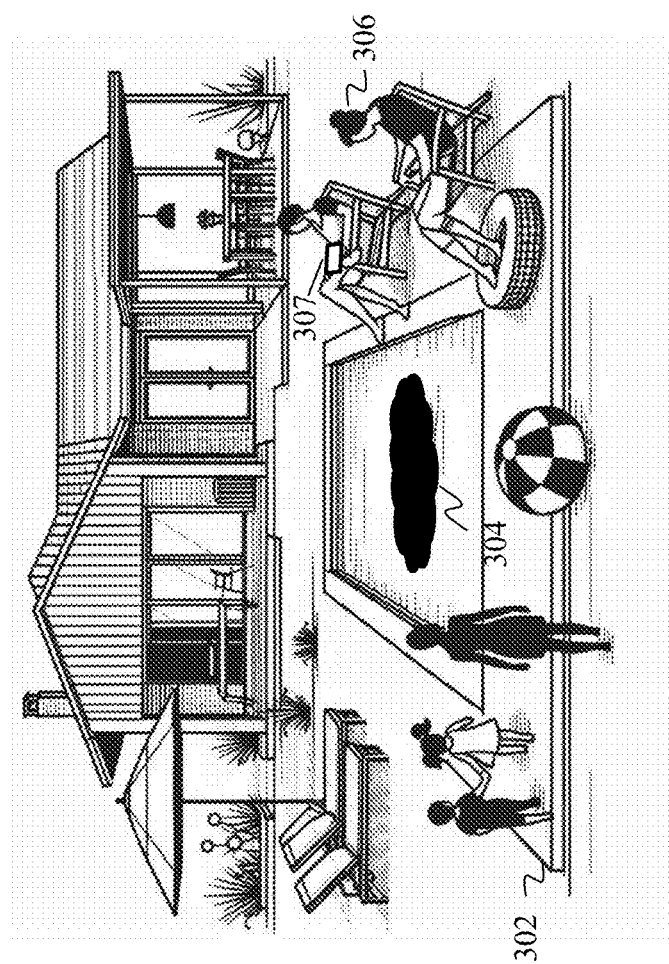
FIG. 3 depicts an illustration of the results of deployment of the dye pack of the wearable computing device, according to an embodiment.

FIG. 3 depicts an illustration of the results of deployment of the dye pack of the wearable safety device 102, according to an embodiment. FIG. 3 depicts a practical scenario demonstrating the functionality of the wearable safety device 102 in a real-life situation involving a family 306 gathered around a pool 302. This figure is designed to illustrate the activation and response sequence of the device when a potential drowning incident occurs. Central to the figure is the pool 302, an environment where the wearable safety device 102 operates. Within the pool, a dark cloud of dye 304 is shown, indicating the activation of the dye release mechanism of the wearable safety device 102. This cloud of dye is released when the device detects immersion, and biometric data has been taken into consideration, wherein the dye serves as a visual marker to aid in locating the wearer quickly and efficiently.

One family member 306 is depicted holding a tablet computer 307, showcasing the connectivity aspect of the wearable safety device 102. The tablet computer represents an external computing device that receives transmitted data from the wearable safety device via the network 260. This data includes biometric information and alerts generated when the device detects an immersion event or abnormal physiological readings.

The dark cloud of dye 304 plays a crucial role in enhancing visibility. When the wearer falls into the water, and vital sign data reflects this fact, the dye emission apparatus is triggered, releasing a highly visible dye into the pool. This dye significantly improves the chances of a quick visual location of the wearer, even in murky or low-light conditions, ensuring that family members or rescuers can promptly reach the individual in distress. The tablet computer 307, connected through the network 260, receives real-time alerts and data transmitted by the wearable safety device 102. This setup demonstrates the device's ability to interface with external devices, providing immediate notifications to guardians or caretakers. The tablet computer may display the wearer's vital signs, GPS location, and emergency alerts, allowing the family member to respond appropriately and swiftly.

Figure 4:
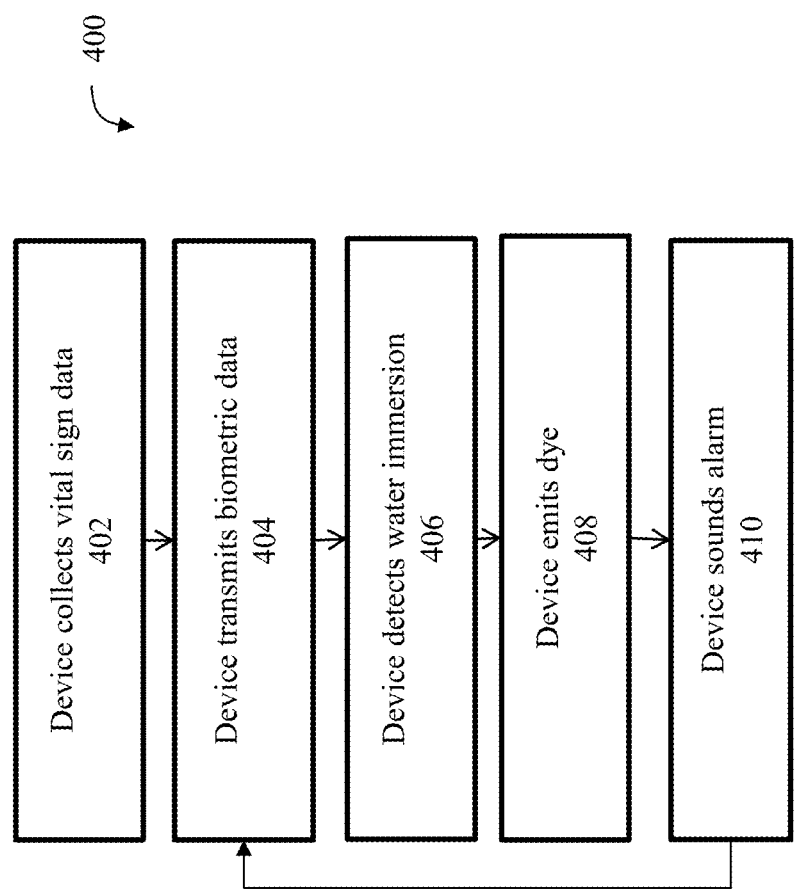
FIG. 4 depicts a flow chart of the steps undertaken by the wearable computing device, according to an embodiment.

FIG. 4 illustrates a flowchart 400 showing the operational sequence performed by the wearable safety device 102 for detecting and responding to potential drowning or distress events, according to an embodiment. The flowchart outlines the steps through which the device 102 continuously collects, processes, evaluates, and acts upon biometric and environmental data to enhance user safety in aquatic environments.

The sequence begins at step 402, where the device 102 collects vital sign data from the wearer using one or more biometric sensors 221 integrated within the waterproof housing. These biometric sensors are configured to monitor physiological parameters such as heart rate, blood oxygen saturation, skin temperature, and respiration rate. This continuous monitoring allows the processor to build and update a real-time health profile of the wearer, which is critical for detecting early signs of distress, such as abnormal heart rates, erratic respiration, or low oxygen levels.

In step 404, the device 102 transmits the collected biometric data, as well as motion sensor data if relevant, to external systems using the wireless communication module 231. This module enables seamless wireless communication with paired mobile devices or networked systems through the network 260, ensuring that designated caregivers, family members, or emergency responders receive timely updates on the wearer's status.

Next, in step 406, the device 102 evaluates environmental conditions to detect water immersion using its water detection subsystem 220. This subsystem may include elements such as a submersion timer, a water conductivity sensor, or a pressure sensor to reliably detect when the device is submerged in water. The processor simultaneously receives biometric data including heart rate, blood oxygen level, skin temperature, and respiration rate from the one or more biometric sensors, along with motion data from the onboard accelerometer and gyroscope. To increase reliability, the processor 212 can correlate water detection results with biometric and motion sensor data to confirm the likelihood of a drowning or distress event—for example, a detected submersion combined with a sudden drop in blood oxygen level or the absence of normal motion. If water immersion is detected, the processor analyzes the biometric and motion data to verify whether the collected data meets predetermined threshold criteria that may indicate a potential drowning or distress event. Such criteria may include combinations of abnormal or absent heart rate, low oxygen saturation, unusual skin temperature, abnormal respiration rate, or lack of expected motion.

At the same time, the processor continues to monitor for manual input from the override interface, which includes a user-activated button allowing the wearer to cancel or reset the distress signal if the event is resolved or was triggered inadvertently.

Upon confirming that the input data meets predefined distress thresholds, the processor 212 initiates multiple safety measures. In step 408, the processor activates the dye release mechanism 250, causing a non-toxic dye contained within a sealed cartridge to be released into the surrounding water. In some embodiments, an electromechanical actuator may pierce the sealed cartridge to deploy the dye. This visible dye cloud spreads rapidly in the water, providing a clear visual marker that aids rescuers in locating the wearer, especially in turbid water or low-light conditions. The cartridge may be single use and replaceable or may be refillable.

Simultaneously, in step 410, the processor 212 activates the alert subsystem 251, which includes a speaker or buzzer and at least one LED. The speaker or buzzer emits a loud audible alarm while the LED flashes conspicuously, alerting nearby people to the wearer's emergency. This alarm can also propagate through the paired mobile device or networked system, such as a smartphone or tablet, ensuring that both local and remote parties are promptly notified.

Collectively, the flowchart 400 of FIG. 4 illustrates how the wearable safety device 102 integrates real-time biometric monitoring, environmental sensing, wireless communication, visible dye marking, and multi-modal alerts to provide a comprehensive drowning prevention and emergency response solution. This coordinated sequence of actions enhances the likelihood of timely rescue and intervention, addressing the shortcomings of conventional marine safety devices.

Figure 5:
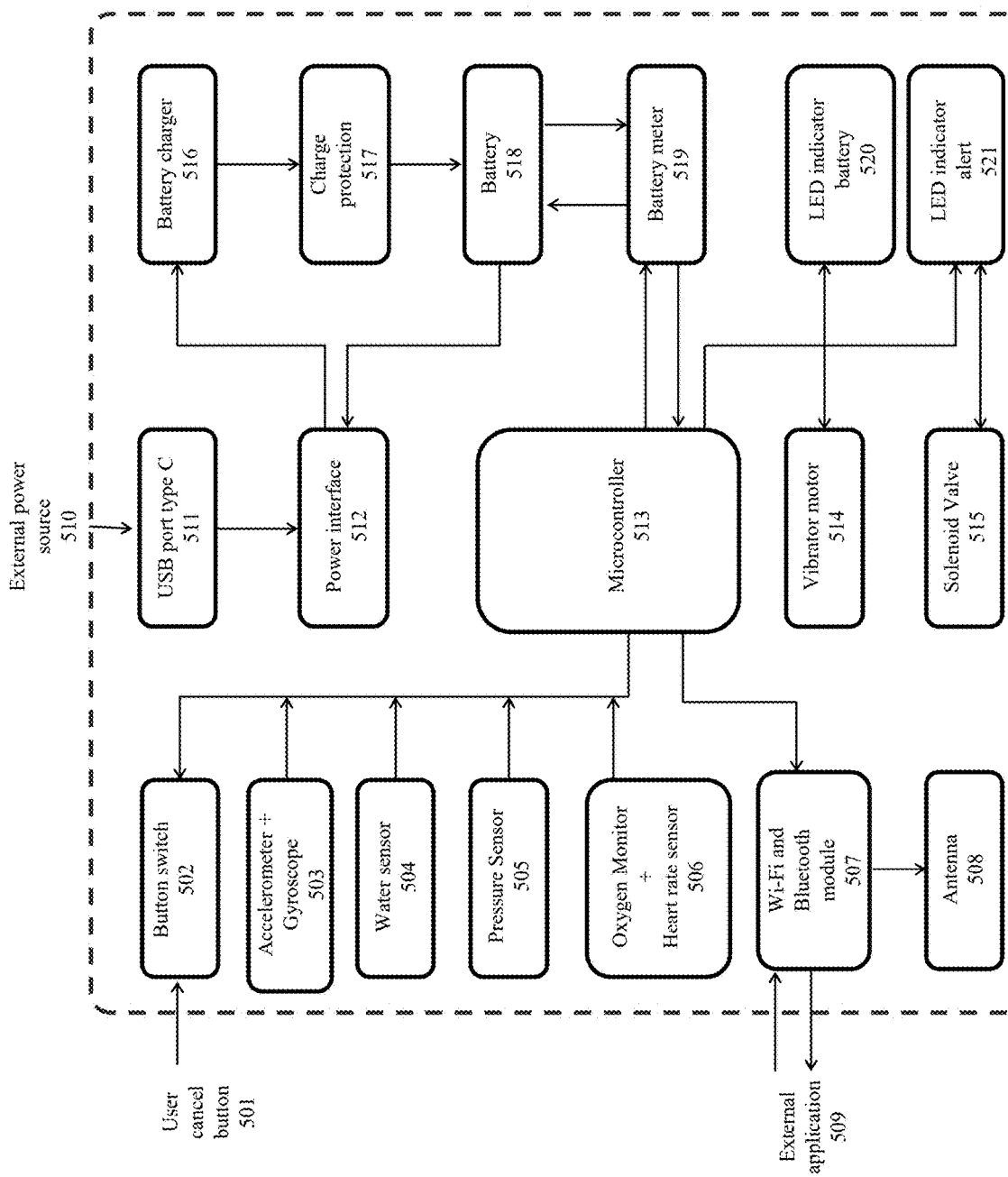
FIG. 5 illustrates a detailed block diagram of the principal hardware and functional components of the wearable safety device for preventing drowning, according to an embodiment.

FIG. 5 illustrates a detailed block diagram of the principal hardware and functional components of the wearable safety device 102 for preventing drowning, according to an embodiment. This figure shows how the integrated subsystems are interconnected to monitor the wearer's physiological and environmental conditions, process data, activate safety responses, and communicate with external systems.

The user cancel button 501 is part of the override interface that allows the wearer to manually interrupt or cancel an alert or dye release sequence if necessary, providing a direct method for the user to indicate that they are safe or that an alert was triggered unintentionally. The button switch 502 is another user input mechanism on the device housing that may serve as a general-purpose input or power control, enabling the user to turn the device on or off or confirm other settings.

The device includes an external power source 510, which may be an interface for connecting an auxiliary charger or an emergency backup power supply to recharge the internal battery when needed. The USB port type C 511 and the power interface 512 provide the physical and electrical connections required for charging the internal battery and for data exchange with external computing devices during setup, maintenance, or data download.

The microcontroller 513 is the main processor that coordinates data acquisition, signal processing, threshold evaluation, control of actuators and indicators, and wireless communication. It integrates input from multiple sensors and user interfaces to execute the logic steps outlined in the flowcharts and claims.

The device includes an accelerometer and gyroscope 503, which detect user movement, orientation, and changes in motion. This motion sensor module provides vital context to distinguish between normal swimming activity and lack of motion consistent with a drowning scenario. The water sensor 504 detects the presence of water contact or immersion, while the pressure sensor 505 measures ambient pressure, providing additional confirmation of submersion depth or sudden pressure changes.

The oxygen monitor and heart rate sensor 506 continuously measure the wearer's blood oxygen saturation and heart rate, which are critical biometric indicators for identifying distress, hypoxia, or sudden cardiac events in water environments.

The Wi-Fi and Bluetooth module 507, together with the antenna 508, enable the wearable safety device 102 to wirelessly communicate with a paired mobile device or a remote monitoring network. This module transmits biometric data, motion status, and emergency alerts and may receive configuration updates or acknowledgments from an external application 509. The external application 509 represents the software or mobile app that interfaces with the device, displaying status, receiving distress signals, and providing caregivers or guardians with real-time monitoring and alerting.

The vibrator motor 514 delivers haptic feedback to the wearer, providing a tactile signal when alerts are triggered, thresholds are reached, or certain actions require the wearer's attention. The solenoid valve 515 forms part of the dye release mechanism; upon activation by the microcontroller 513, it opens or actuates to discharge non-toxic dye from a sealed cartridge, visibly marking the water to help rescuers locate the wearer quickly.

The internal power management system includes the battery charger 516, which controls safe recharging of the internal battery 518. The charge protection circuit 517 prevents overcharging and other electrical faults, safeguarding the battery and internal electronics. The battery meter 519 monitors the battery's charge level and provides this information to the microcontroller for display or wireless reporting.

The alert output elements include the LED indicator alert 521, which emits visual warning signals during an emergency or device status notifications, and the LED indicator battery 520, which shows the current battery status to the user, helping ensure the device remains adequately powered.

The components illustrated in FIG. 5 show how the wearable safety device 102 integrates robust sensing, signal processing, manual override, power management, haptic and visual feedback, wireless communication, and interaction with an external application 509. These elements work together within a compact waterproof housing and are powered by an internal rechargeable battery, ensuring reliable operation to detect and respond to potential drowning or distress situations.

Figure 6:
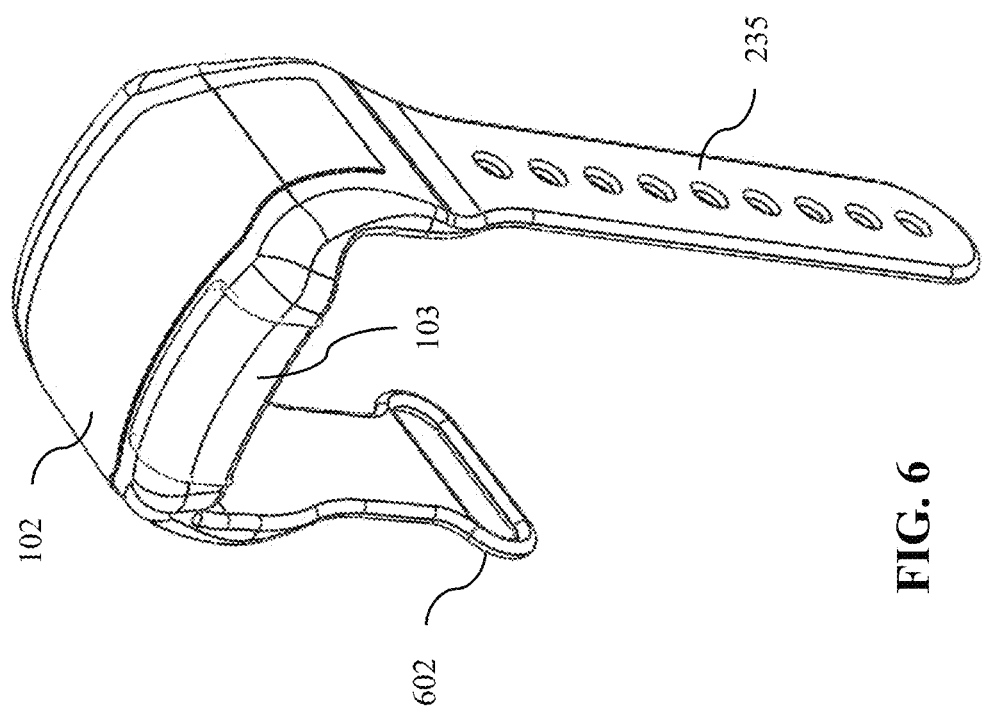
FIG. 6 illustrates a top perspective view of the wearable safety device, according to an embodiment.

FIG. 6 illustrates a top perspective view of the wearable safety device 102, showing how the device may be secured to the user's wrist or limb. The housing 103 encloses the internal electronics and sensors, providing a waterproof and impact-resistant shell for all functional components. The band 235 extends from opposing sides of the housing 103 and is configured to wrap securely around the user's wrist or limb. The band includes a band buckle 602, which enables adjustable tightening and secure fastening, ensuring a stable and comfortable fit during all aquatic activities. The band fit children, toddlers and babies of all sizes with a size adjustable feature.

Figure 7:
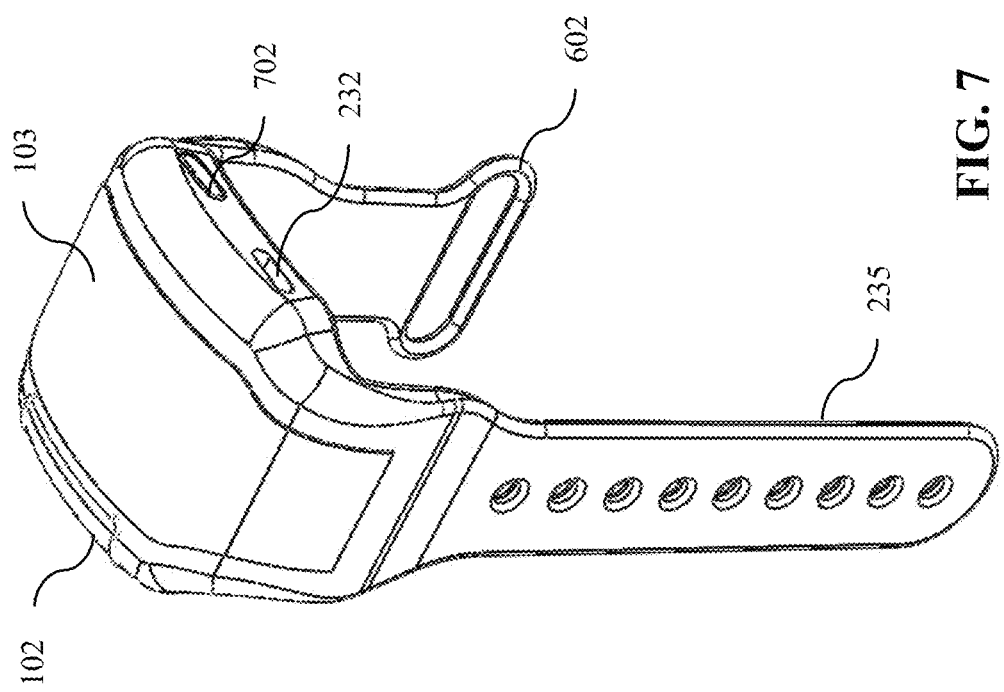
FIG. 7 illustrates another top perspective view of the wearable safety device, according to an embodiment.

FIG. 7 presents another top perspective view of the wearable safety device 102, further highlighting the housing 103, the band 235, and the band buckle 602. This figure also clearly shows the push button 702 integrated into the outer surface of the housing 103. The push button 702 is part of the override interface described in the claims, allowing the wearer to manually cancel or reset an alert or the dye release mechanism if needed. The override interface 232 is schematically shown to illustrate its position relative to the push button 702 and the housing, ensuring easy access by the wearer.

Figure 8:
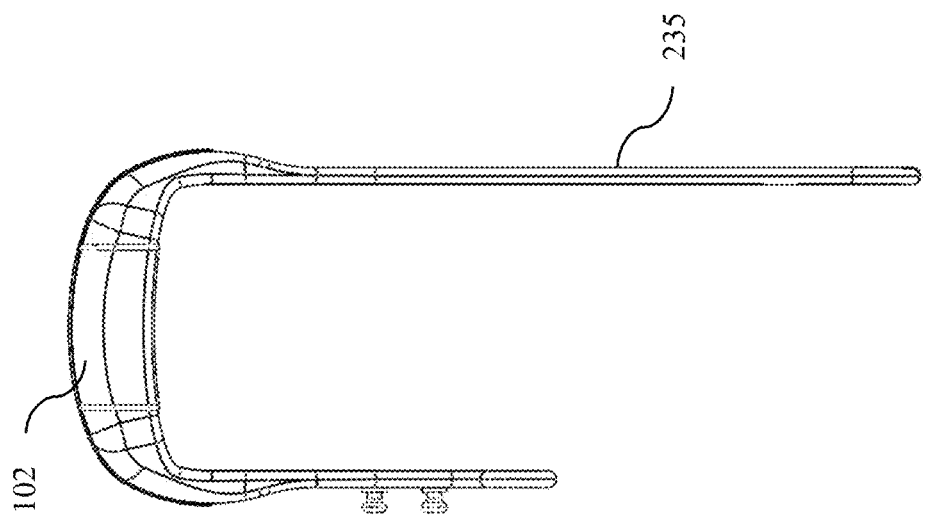
FIG. 8 illustrates a left side view of the wearable safety device, according to an embodiment.

FIG. 8 shows a left side view of the wearable safety device 102, mounted on the band 235. This figure emphasizes the compact form factor and the smooth integration of the band with the main housing. The design ensures minimal drag in water while maintaining user comfort and full functionality.

Figure 9:
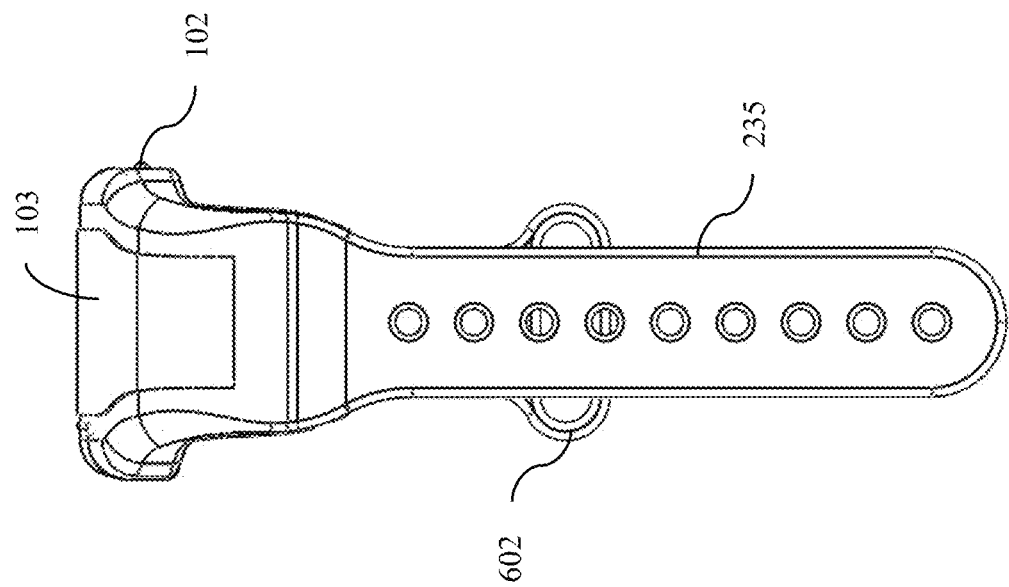
FIG. 9 illustrates a front view of the wearable safety device, according to an embodiment.

FIG. 9 provides a front view of the wearable safety device 102, further illustrating the arrangement of the housing 103, the band 235, and the band buckle 602. This view demonstrates how the buckle 602 interacts with the band to secure the device around the user's wrist or limb, reinforcing the adjustable and secure fit essential for maintaining continuous sensor contact and proper positioning during vigorous activity.

Figure 10:
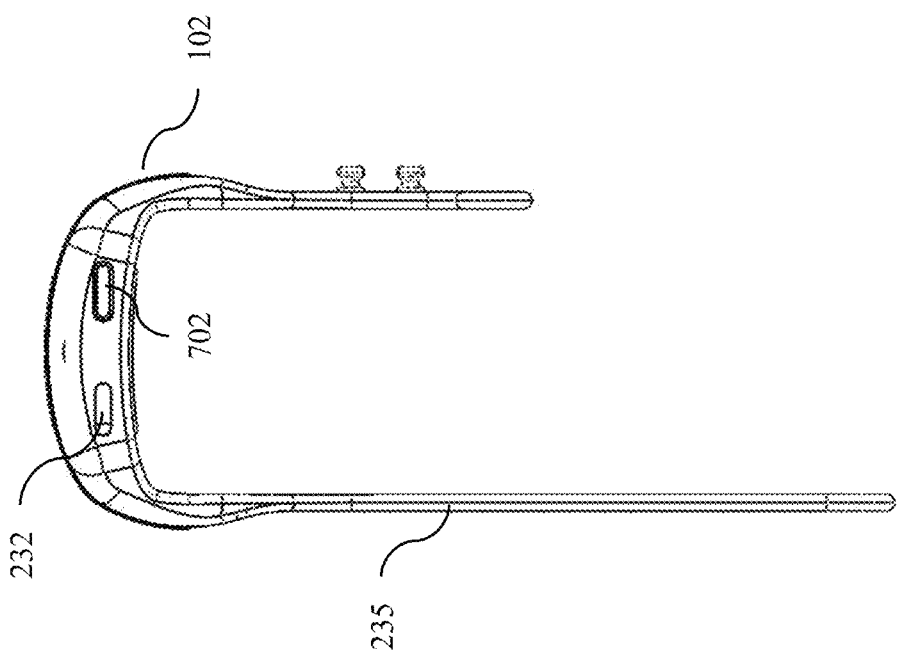
FIG. 10 illustrates a right-side view of the wearable safety device, according to an embodiment.

FIG. 10 depicts a right-side view of the wearable safety device 102 focusing on the placement of the override interface 232 and the push button 702 relative to the housing 103 and the band 235. The push button 702 is positioned for easy manual access without obstructing the band 235 or compromising the waterproof seal of the housing. This arrangement ensures that the wearer can quickly press the push button to manually override or cancel the automated emergency response sequence if needed.

Figure 11:
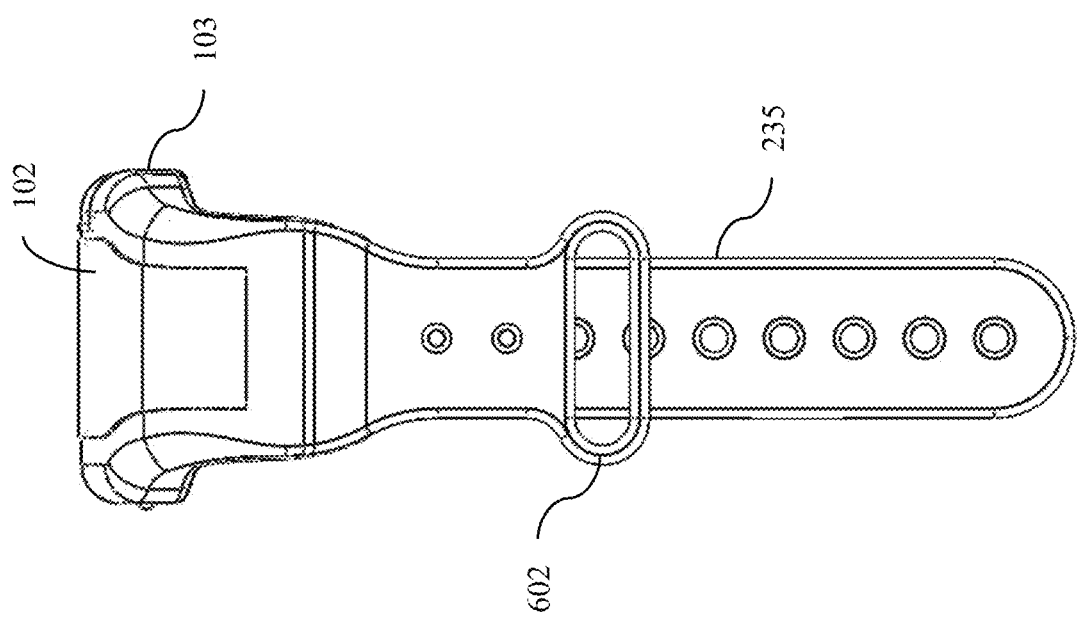
FIG. 11 illustrates a rear view of the wearable safety device, according to an embodiment.

FIG. 11 shows a clear rear view of the wearable safety device 102, highlighting how the housing 103, the band 235, and the band buckle 602 cooperate to maintain a snug, comfortable fit on the wearer's wrist or limb. The figure also reinforces the compact, ergonomic design that allows the user to wear the device unobtrusively for extended periods during various water-based activities, ensuring reliable operation of all safety features described in the claims Embodiments may be described above with reference to functions or acts, which comprise methods. The functions/acts noted above may occur out of order as shown or described. For example, two functions/acts shown or described in succession may in fact be executed substantially concurrently or the functions/acts may sometimes be executed in the reverse order, depending upon the functionality/acts involved. While certain embodiments have been described, other embodiments may exist. Further, the disclosed methods' functions/acts may be modified in any manner, including by reordering functions/acts and/or inserting or deleting functions/acts, without departing from the spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A wearable safety device for preventing drowning, comprising:
   (a) a housing configured to be worn on a user's wrist or limb and configured to be waterproof;
   (b) one or more biometric sensors located within the housing, the one or more biometric sensors configured to measure data selected from the group consisting of heart rate, blood oxygen level, skin temperature, and respiration rate;
   (c) at least one motion sensor located within the housing;
   (d) a water detection subsystem coupled to the housing, the water detection subsystem comprising an element selected from the group consisting of a submersion timer, a water conductivity sensor, and a pressure sensor;
   (e) a processor located within the housing, the processor configured to receive input data from the one or more biometric sensors, the at least one motion sensor, and the water detection subsystem, and to perform real-time physiological and situational analysis by evaluating whether the input data meets predetermined threshold conditions indicative of a potential drowning or distress event, the predetermined threshold conditions comprising a combination of abnormal or absent heart rate, low oxygen saturation, abnormal respiration rate, lack of motion, and submersion detection;
   (f) a dye release mechanism communicably coupled with the processor, the dye release mechanism configured to visibly mark surrounding water with a non-toxic dye upon activation by the processor;
   (g) an alert subsystem communicably coupled with the processor, the alert subsystem comprising a speaker or buzzer and at least one LED, configured to activate upon activation by the processor; and
   (h) a wireless communication module communicably coupled with the processor, the wireless communication module configured to transmit a distress signal to a paired mobile device or networked system.

2. The wearable safety device of claim 1, wherein the housing is sized and oriented to be substantially similar to a wristwatch case.

3. The wearable safety device of claim 2, wherein the housing further comprises a band configured to fit on the user's wrist or limb.

4. The wearable safety device of claim 3, wherein the dye release mechanism further comprises a sealed cartridge holding the non-toxic dye.

5. The wearable safety device of claim 4, wherein the dye release mechanism is further configured to allow replacement of the sealed cartridge holding the non-toxic dye.

6. The wearable safety device of claim 5, wherein the dye release mechanism further comprises an electromechanical actuator configured to pierce the sealed cartridge to release the non-toxic dye.

7. The wearable safety device of claim 6, further comprising a GPS module communicably coupled with the processor and configured to provide location data to the processor.

8. The wearable safety device of claim 7, wherein the wireless communication module is further configured to transmit location data to the paired mobile device or networked system.

9. The wearable safety device of claim 8, wherein the wireless communication module is further configured to transmit the distress signal and location data to a mobile application on the paired mobile device or networked system.

10. The wearable safety device of claim 1, wherein the mobile application is configured to receive and display the distress signal and location data.

11. A wearable safety device for preventing drowning, comprising:
(a) a housing configured to be worn on a user's wrist or limb and configured to be waterproof;
(b) one or more biometric sensors located within the housing, the one or more biometric sensors configured to measure data selected from the group consisting of heart rate, blood oxygen level, skin temperature, and respiration rate;
(c) at least one motion sensor located within the housing;
(d) a water detection subsystem coupled to the housing, the water detection subsystem comprising an element selected from the group consisting of a submersion timer, a water conductivity sensor, and a pressure sensor;
(e) a processor located within the housing, the processor configured to receive input data from the one or more biometric sensors, the at least one motion sensor, and the water detection subsystem, and to perform real-time physiological and situational analysis by evaluating whether the input data meets predetermined threshold conditions indicative of a potential drowning or distress event, the predetermined threshold conditions comprising a combination of abnormal or absent heart rate, low oxygen saturation, abnormal respiration rate, lack of motion, and submersion detection;
(f) a dye release mechanism communicably coupled with the processor, the dye release mechanism configured to visibly mark surrounding water with a non-toxic dye upon activation by the processor;
(g) an alert subsystem communicably coupled with the processor, the alert subsystem comprising a speaker or buzzer and at least one LED, configured to activate upon activation by the processor;
(h) a wireless communication module communicably coupled with the processor, the wireless communication module configured to transmit a distress signal to a paired mobile device or networked system; and
(i) an override interface communicably coupled with the processor, the override interface comprising a manual button.

12. The wearable safety device of claim 11, wherein the housing is sized and oriented to be substantially similar to a wristwatch case.

13. The wearable safety device of claim 12, wherein the housing further comprises a band configured to fit on the user's wrist or limb.

14. The wearable safety device of claim 13, wherein the dye release mechanism further comprises a sealed cartridge holding the non-toxic dye.

15. The wearable safety device of claim 14, wherein the dye release mechanism is further configured to allow replacement of the sealed cartridge holding the non-toxic dye.

16. The wearable safety device of claim 15, wherein the dye release mechanism further comprises an electromechanical actuator configured to pierce the sealed cartridge to release the non-toxic dye.

17. The wearable safety device of claim 16, further comprising a GPS module communicably coupled with the processor and configured to provide location data to the processor.

18. The wearable safety device of claim 17, wherein the wireless communication module is further configured to transmit location data to the paired mobile device or networked system.

19. The wearable safety device of claim 18, wherein the wireless communication module is further configured to transmit the distress signal and location data to a mobile application on the paired mobile device or networked system.

20. The wearable safety device of claim 11, wherein the mobile application is configured to receive and display the distress signal and location data.

* * * * *